(12) United States Patent
Yi

(10) Patent No.: US 10,996,902 B2
(45) Date of Patent: May 4, 2021

(54) PARALLEL PROCESSING OF MONOCHROMATIC PRINT JOBS USING DATA-PROCESSING COLOR CHANNELS OF COLOR PRINTING DEVICE THAT CORRESPOND TO DIFFERENT COLOR COLORANTS

(71) Applicant: Hewlett-Packard Development Company, L.P., Spring, TX (US)

(72) Inventor: Sheng Yi, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/621,010

(22) PCT Filed: Jun. 30, 2017

(86) PCT No.: PCT/US2017/040336
§ 371 (c)(1),
(2) Date: Dec. 10, 2019

(87) PCT Pub. No.: WO2019/005118
PCT Pub. Date: Jan. 3, 2019

(65) Prior Publication Data
US 2020/0201586 A1 Jun. 25, 2020

(51) Int. Cl.
*H04N 1/60* (2006.01)
*G06F 3/12* (2006.01)
(52) U.S. Cl.
CPC .......... *G06F 3/1217* (2013.01); *G06F 3/1241* (2013.01)

(58) Field of Classification Search
None
See application file for complete search history.

(56) References Cited

U.S. PATENT DOCUMENTS

| 5,774,654 | A | * | 6/1998 | Maki | H04N 1/32797 |
| | | | | | 340/2.71 |
| 5,937,152 | A | * | 8/1999 | Oda | G06K 15/00 |
| | | | | | 358/1.16 |
| 6,002,814 | A | | 12/1999 | Chadez | |
| 7,268,914 | B2 | * | 9/2007 | Noguchi | H04N 1/46 |
| | | | | | 358/1.9 |
| 7,286,717 | B2 | * | 10/2007 | Nomizu | H04N 1/32561 |
| | | | | | 358/1.9 |

(Continued)

FOREIGN PATENT DOCUMENTS

JP 11179975 A 7/1999

OTHER PUBLICATIONS

OKI Printing Solutions New Color and Mono Multifunction Printers Improve Business Performance and Maximize Office Efficiency for SMB Market ~ http://www.okidata.com/~2009~3 pgs.

*Primary Examiner* — Ted W Barnes
(74) *Attorney, Agent, or Firm* — Michael A Dryja

(57) ABSTRACT

A color printing device can include a print engine, a circuit, and a processor. The print engine prints onto physical media using different color colorants. The circuit has data-processing color channels corresponding to the different color colorants. The processor receives monochromatic print jobs and transmits the received monochromatic print jobs to unused color channels of the color channels for processing in parallel. The processor can transmit the processed monochromatic print jobs to the print engine for printing.

14 Claims, 5 Drawing Sheets

(56) References Cited

U.S. PATENT DOCUMENTS

| | | | |
|---|---|---|---|
| 7,589,858 B2* | 9/2009 | Atsumi | H04N 19/186 |
| | | | 348/266 |
| 8,144,355 B2 | 3/2012 | Nelson et al. | |
| 8,284,411 B1* | 10/2012 | Keithley | G03G 15/6529 |
| | | | 358/1.13 |
| 2005/0168770 A1 | 8/2005 | Kurose | |
| 2009/0207458 A1* | 8/2009 | Doggett, III | H04N 1/54 |
| | | | 358/3.29 |
| 2009/0279904 A1* | 11/2009 | Toh | G03G 15/50 |
| | | | 399/12 |
| 2010/0202004 A1* | 8/2010 | Tanimoto | H04N 1/46 |
| | | | 358/1.9 |
| 2013/0088731 A1* | 4/2013 | Larson | G06K 15/1865 |
| | | | 358/1.9 |
| 2013/0099731 A1 | 4/2013 | Schaefer | |
| 2016/0292549 A1* | 10/2016 | Corr | G06K 15/1817 |

* cited by examiner

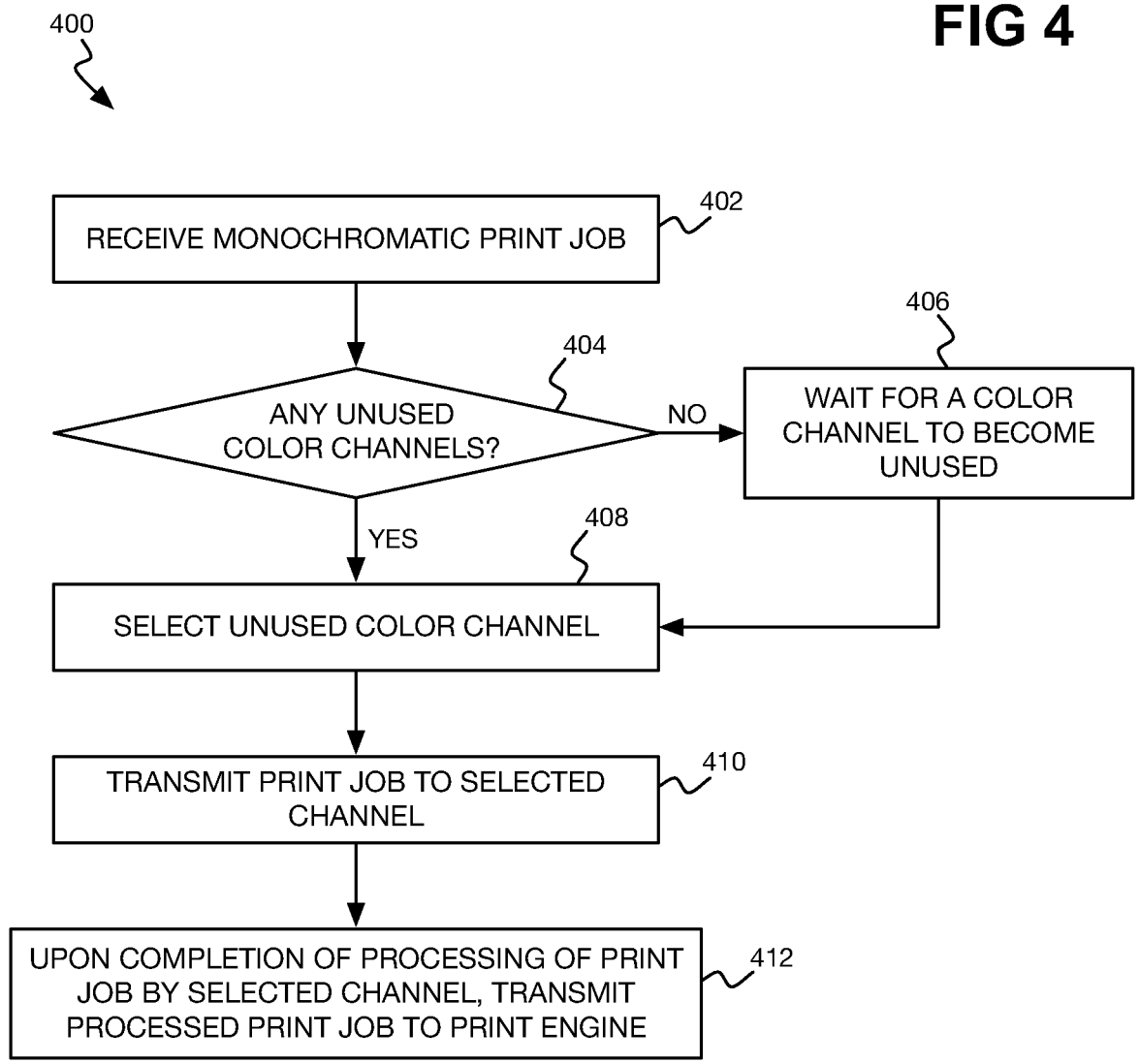

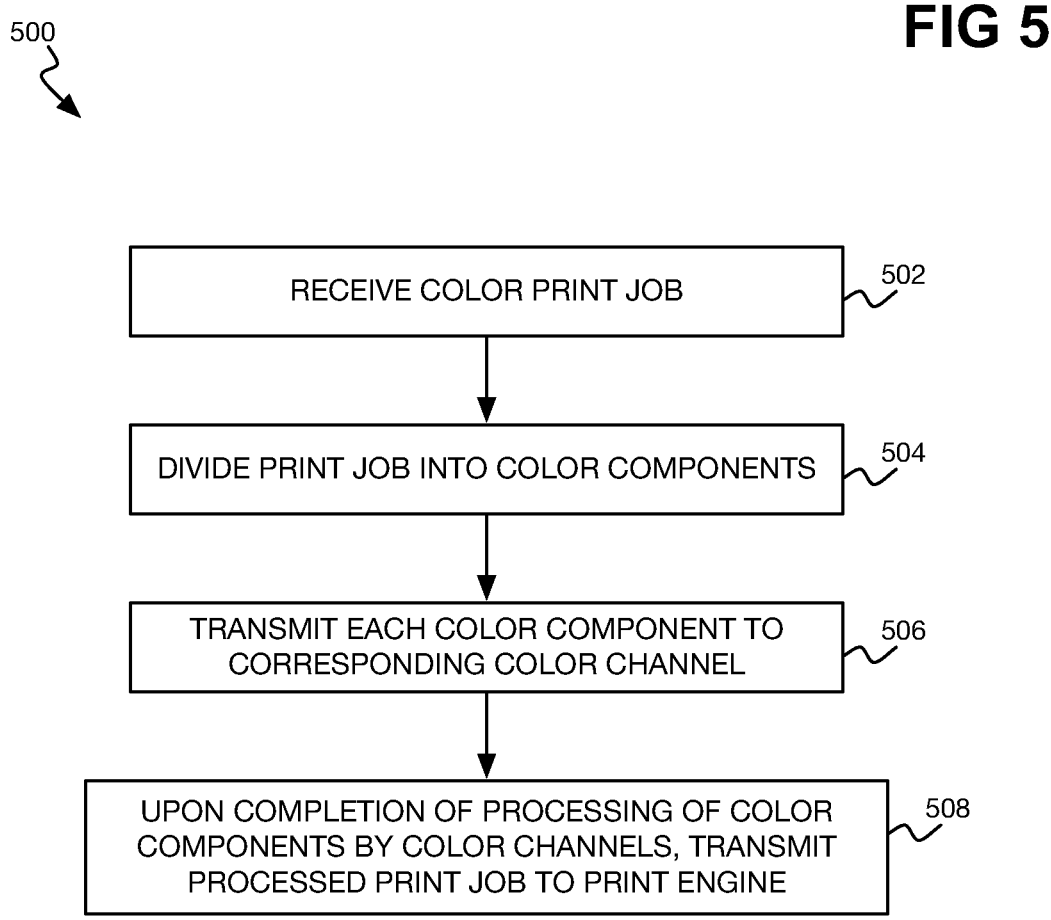

PARALLEL PROCESSING OF MONOCHROMATIC PRINT JOBS USING DATA-PROCESSING COLOR CHANNELS OF COLOR PRINTING DEVICE THAT CORRESPOND TO DIFFERENT COLOR COLORANTS

BACKGROUND

Printing devices include standalone printers as well as multifunction devices (MFDs), multifunction printers (MFPs), and all-in-one (AIO) devices that include printing functionality as well as other functionality, such as scanning, copying, and/or faxing, and so on. A printing device uses colorant to form images on physical media such as paper. For example, a laser printing device uses toner, whereas an inkjet printing device uses ink.

A monochromatic printing device uses one color of colorant to print on physical media. For example, a black-and-white printing device uses black colorant. A color printing device uses a number of colorants corresponding to the color space or color model that the printing device employs to print full-color images on physical media. For example, a color printing device can use cyan, magenta, yellow, and black colorant, corresponding to a cyan, magenta, yellow, and black (CMYK) color space.

BRIEF DESCRIPTION OF THE DRAWINGS

FIG. 4 is a flowchart of an example method for printing a monochromatic print job by the printing device of FIG. 1.

FIG. 5 is a flowchart of an example method for printing a color print job by the printing device of FIG. 1.

DETAILED DESCRIPTION

Figure 1:
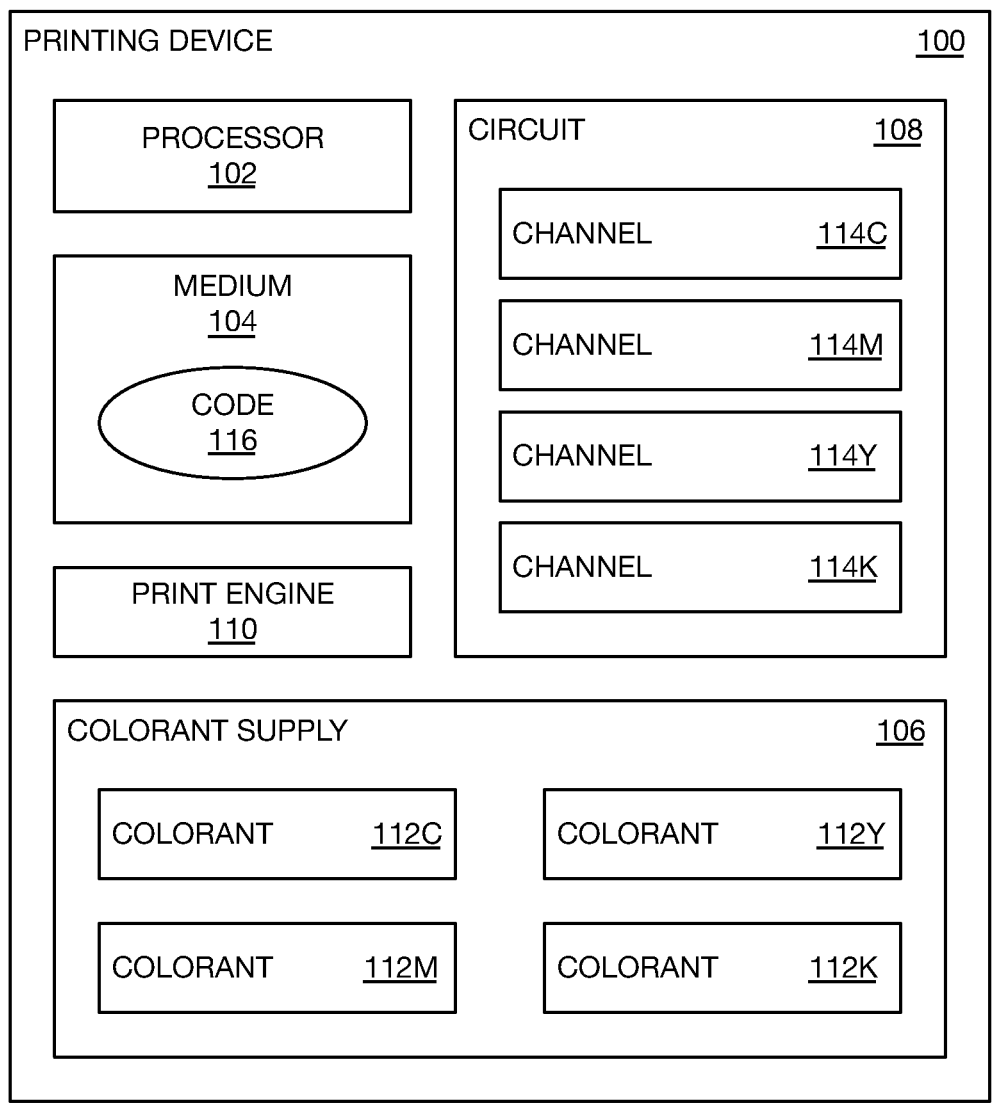
FIG. 1 is a block diagram of an example printing device.

As noted in the background, a color printing device uses a number of colorants corresponding to the color space or color model that the printing device employs to print full-color images on physical media. A color laser printer, for instance, may use cyan, magenta, yellow, and black toner so that the printer can print in full color. The different colorants can be differently combined on a pixel-by-pixel basis of an image to be printed on a physical medium to yield the colors of image's pixels.

A color printing device can still print monochromatic images. For example, a color printing device that has black colorant in addition to cyan, magenta, and yellow colorant can use the black colorant to print in just black and white (including in gray scale). As another example, a color printing device that lacks black colorant but that has cyan, magenta, and yellow colorant can print black-and-white images by printing in cyan, magenta, and yellow in equal amounts to achieve black-and-white (including gray scale) printing.

A color printing device may receive a print job in compressed form from a host device like a computing device such as a desktop or laptop computer. The printing device therefore has to perform processing on the print job prior to a print engine of the printing device outputting colorant on physical media to print the print job. Processing includes decompression of the compressed data of the received print job, and may also including other processing, such as halftoning, and so on.

The print engine is the mechanism of the printing device that outputs colorant onto physical media to print the print job. For example, a laser printing device uses a laser print engine to apply toner onto physical media like paper. By comparison, an inkjet printing device uses an inkjet print engine to apply ink onto such physical media. The printing device controls the print engine according to the received print job after the print job has been processed.

To aid in the processing of a print job, a printing device can include a circuit, such as an integrated circuit (IC) like an application-specific IC (ASIC). The circuit can process a print job more quickly than a general-purpose processor, such as a central processing unit (CPU), which may also be included in the printing device. An example of such a circuit is a time-delineated multipurpose (TDMP) ASIC.

Within a color printing device, such a circuit can include a number of channels corresponding to the different color colorants of the printing device. For example, if the printing device includes cyan, magenta, yellow, and black colorants, then there are four color channels. When the printing device receives a compressed print job, each color channel of the circuit is responsible for performing processing on the data for a different color component (e.g., cyan, magenta, yellow, or black) of the print job. The channels can process their respective color components in parallel with one another.

When such a color printing device having a circuit with multiple color channels corresponding to the different color colorants of the printing device receives a monochromatic print job, just the color channel corresponding to the color of the print job processes the print job. For instance, just the black channel processes a black-and-white print job. The other color channels of the circuit, such as the cyan, magenta, and yellow channels, remain unused.

Techniques are disclosed herein leverage these unused color channels to perform faster processing of monochromatic print jobs within a color printing device. For instance, a monochromatic print job may have a number of pages. Rather than having the same color channel sequentially process the pages of the print job, all the color channels of the printing device's circuit may be employed to process multiple pages of the print job in parallel. For example, the cyan channel may process the first page, while the magenta channel processes the second page, the yellow channel processes the third page, and the black channel processes the fourth page.

Therefore, for a color printing device having a circuit with N color channels corresponding to N different color colorants, processing of monochromatic print jobs can occur at up to N times more quickly than if just one channel were used to process these print jobs. Monochromatic print jobs by definition use just one color colorant, such as black colorant. Nevertheless, the techniques disclosed herein leverage the color channels of the circuit corresponding to the other color colorants, such as cyan, magenta, and yellow, to also process such monochromatic print jobs, even though the other color channels do not correspond to the colorant color of the print jobs.

FIG. 1 shows an example color printing device 100. The printing device 100 may be a standalone printer, or a multifunction device (MFD), multifunction printer (MFP), or all-in-one (AIO) device that includes printing functionality as well as other functionality, such as scanning, copying, and/or faxing, and so on. The printing device 100 includes a processor 102, a non-transitory computer-readable data storage medium 104, a colorant supply 106, a circuit 108, and a print engine 110.

The processor 102 may be a CPU, such as one having a complex instruction set computer (CISC) architecture or a reduced instruction set computer (RISC) architecture. The non-transitory computer-readable data storage medium 104 may be a volatile or a non-volatile medium, may be a semiconductor or a magnetic medium, and so on. The storage medium 104 stores program code 116 that the processor 102 executes, such as to perform methods that are described later in the detailed description.

The colorant supply 106 is a supply of colorants of multiple colors, and which may be dry or liquid toner, solid or liquid ink, and so on. In the example of FIG. 1, the colorant supply 106 includes cyan colorant 112C, magenta colorant 112M, yellow colorant 112Y, and black colorant 112K, which are collectively referred to as the colorants 112, and which correspond to the colors of the CMYK color space. The colorant supply 106 can include colorants of multiple colors that correspond to other color spaces instead, however.

The circuit 108 may be an IC, such as an ASIC. The circuit 108 is a special-purpose circuit to perform processing on received print jobs, such as decompression, halftoning, and so on. The processor 102 can thus offload such processing onto the circuit 108, which can perform the processing more quickly than the processor 102 can by executing the code 116. The circuit 108 may be a TDMP ASIC.

The circuit 108 includes multiple data-processing color channels corresponding to the colorants 112 and thus to the colors of the color space that the printing device 100 employs to print in full color. In the example of FIG. 1, therefore, the circuit includes a data-processing cyan channel 114C, a data-processing magenta channel 114M, a data-processing yellow channel 114Y, and a data-processing black channel 114K, which are collectively referred to as the data-processing color channels 114. The color channels 114C, 114M, 114Y, and 114K therefore respectively correspond to the colors of the colorants 112C, 112M, 112Y, and 112K.

Each data-processing color channel 114 can be a data pipeline, which is a set of connected data processing elements. The input of a color channel 114 can be a print job or a page of a print job, such as a compressed print job. The output of a color channel 114 is the processed form of the print job or the page in question, such as a decompressed print job. The processing of one color channel 114 is independent of the processing of each other color channel 114. As such, the processing of the color channels 114 can be performed in parallel.

The print engine 110 forms images on physical media, such as paper, and thus is the mechanism of the printing device 100 that prints received print jobs. More specifically, the print engine 110 uses the colorants 112 from the colorant supply 116 to print on physical media, monochromatically or in (full) color. The print engine 110 may be a laser print engine, in which case the colorants 112 may be toner and the printing device 100 is a laser printing device. The print engine 110 may be an inkjet print engine, in which case the colorants 112 may be ink and the printing device 100 is an inkjet printing device.

In general, the processor 102 receives a print job, such as from a host device like a computing device such as a desktop or a laptop computer. In one implementation, the print job can have multiple pages. In another implementation, a print job may be considered an "overall" print job having multiple pages that themselves each correspond to single-page print jobs. The received print job can be compressed. The processor 102 in general sends the received print job to circuit 102 for processing, such as decompression. The processor 102 then controls the print engine 110 according to the processed print job to print the print job onto a physical medium; it is synonymously stated in this respect that the processor 102 transmits the processed print job to the print engine 110 for printing the print job.

Figure 2:
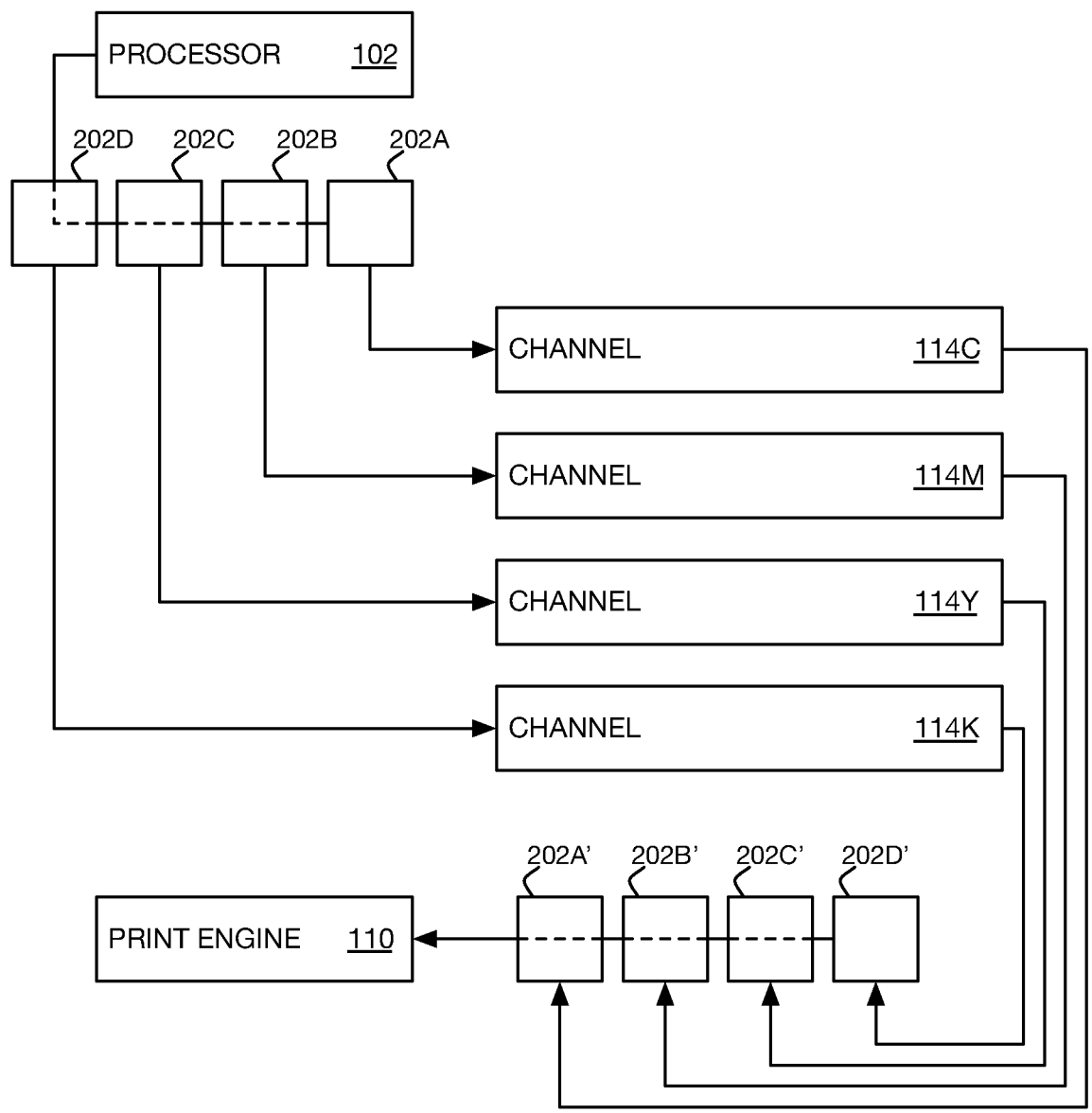
FIG. 2 is a diagram of example operation of the printing device of FIG. 1 to print monochromatic print jobs.

FIG. 2 illustratively depicts example operation of the printing device 100 of FIG. 1 in printing monochromatic print jobs. The processor 102, the data-processing color channels 114 of the circuit 108, and the print engine 110 are explicitly shown in FIG. 2. The computer-readable data storage medium 104 with its program code 116 and the colorant supply 106 with its differently colored colorants 112 are not shown in FIG. 2 for illustrative clarity and convenience. However the medium 104 and the colorant supply 106 are both present during the operation of FIG. 2. For instance, the functionality ascribed to the processor 102 can be realized by the processor 102 executing the code 116 from the medium 104, and the print engine 110 prints onto physical media using the colorants 112 of the colorant supply 106.

The processor receives monochromatic print jobs 202A, 202B, 202C, and 202D, which are collectively referred to as the print jobs 202. The print jobs 202 may be separate print jobs, in which case in the example of FIG. 2, the print job 202A is received before the print job 202B, which is received before the print job 202C, which is received before the print job 202D. The print jobs 202 can be separate pages of the same "overall" print job, in which case in the example of FIG. 2, the print jobs 202A, 202B, 202C, and 202C respectively correspond to the first, second, third, and fourth pages of this print job.

Each of the print jobs 202 is monochromatic in that the print engine 110 uses just one color 1 to print an image corresponding to the print job 202 onto a physical medium like paper. For example, each of the print jobs 202 may be a black-and-white print job, such that the print engine 110 uses just the black colorant 112K to print a corresponding image onto a physical medium. The print jobs 202 may be of the same or different color, however.

In the example of FIG. 2, the processor 102 transmits the print job 202A to the color channel 114C for processing, the print job 202B to the color channel 114M for processing, the print job 202C to the color channel 114Y for processing, and the print job 202D to the color channel 114K for processing. Therefore, the color channels 114 can process their respectively received print jobs 202 in parallel. For instance, if the print jobs 202 are compressed, the channels 114 may decompress the print jobs 202.

The processor 102 thus transmits each print job 202 to a given color channel 114 regardless of whether the color of colorant 112 to which the channel 114 corresponds is the color of the print job 202 in question. For instance, each print job 202 may be a black-and-white print job that uses black colorant 112K. Nevertheless, the print job 202A is transmitted to the cyan color channel 114C, the print job 202B is transmitted to the magenta color channel 114M, and the print job 202C is transmitted to the yellow color channel 114Y. Just the print job 202D happens to be transmitted to the black color channel 114K; that is, just the print job 202D happens to be transmitted to the color channel 114K corresponding to the color of the print job 202D.

The color channels 114C, 114M, 114Y, and 114K output processed versions of the print jobs 202A, 202B, 202C, and 202D, respectively, which are identified as the processed print jobs 202A', 202B', 202C', and 202D' in FIG. 2, and which are collectively referred to as the process print jobs 202'. The processed print jobs 202' are output to the print engine 110. Stated in another way, the processor 102 can, upon completion of processing of each print job 202 by a corresponding color channel 114, transmit the respective processed print job 202' to the print engine 110. The print engine 110 then uses the colorant supply 106 of FIG. 1 to output the processed print job 202' in question onto a physical medium.

The color channels 114 may not output the processed print jobs 202' in the order in which the processor 102 transmitted the print jobs 202 to the channels 114 for processing. For example, a first print job 202 may be more complex than a second print job 202, such that the color channel 114 processing the first print job 202 takes longer to output the corresponding processed print job 202' than the color channel 114 processing the second print job 202 does to output its corresponding processed print job 202'. As such, even if the processor 102 transmits the first print job 202 to one color channel 114 before the processor 102 transmits the second print job 202 to a different color channel 114, the latter channel 114 may output a corresponding processed print job 202' before the former channel 114 outputs its corresponding processed print job 202'.

If the print jobs 202 are separate print jobs, the processor 102 may transmit the processed print jobs 202' to the print engine 110 in the order in which the color channels 114 output the processed print jobs 202'. Therefore, the print engine 110 may print a relatively simple print job 202 before it prints a more complex print job 202, because the print job 202' corresponding to the complex print job 202 is completed before the print job 202' corresponding to the simple print job 202 is completed. This technique ensures optimal usage of the print engine 110.

However, if the print jobs 202 are pages of the same "overall" print job, the processor 102 transmits the processed print jobs' 202 to the print engine 110 in the order in which processor 102 transmits the print jobs 202 to the color channels 114. For example, if the print job 202A is the first page of a document and the print job 202B is the second page of this document, the print engine 110 prints the processed print job 202A' before the engine 110 prints the processed print job 202B', regardless of the order in which the processed print jobs 202A' and 202B' are completed by their respective color channels 114. In this example, for instance, the print job 202A may be more complex than the print job 202B, such that the processed print job 202b' is completed before the print job 202A' is completed. However, the processor 102 does not transmit the processed job 202B' to the print engine 110 before it transmits the processed print job 202A' to retain the page order of the "overall" print job of which the print jobs 202 are a part. Therefore, if the processed print job 202B' is completed before the processed print job 202A', the processor 102 still waits for completion of the processed print job 202A' so that the processor 102 can send the processed print job 202A' to the print engine 110 before it sends the already completed processed print job 202B' to the engine 110.

Figure 3:
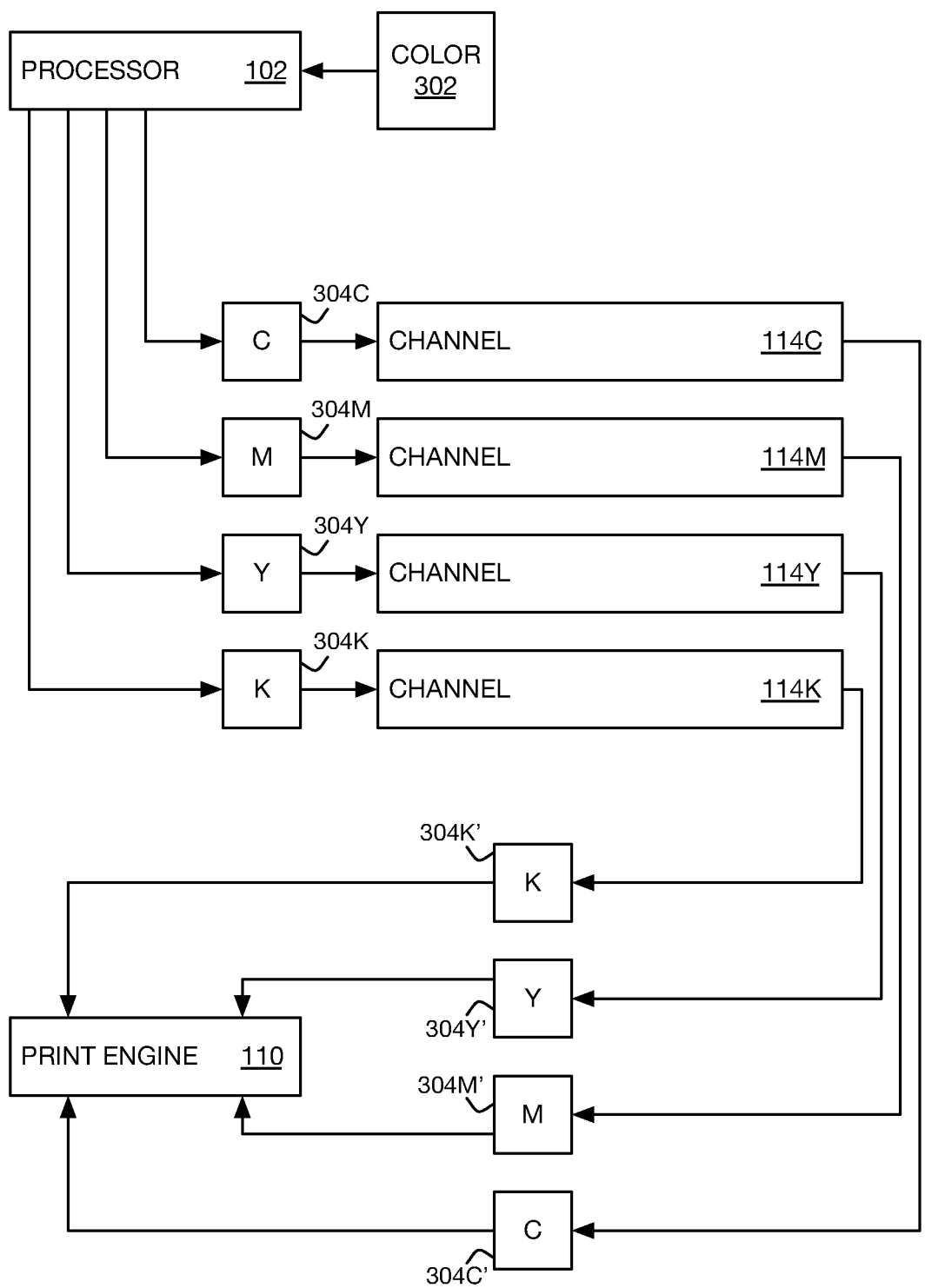
FIG. 3 is a diagram of example operation of the printing device of FIG. 1 to print a color print job.

FIG. 3 illustratively depicts example operation of the printing device 100 of FIG. 1 in printing a color print job. The processor 102, the data-processing color channels 114 of the circuit 108, and the print engine 110 are explicitly shown in FIG. 3. The computer-readable data storage medium 104 with its program code 116 and the colorant supply 106 with its differently colored colorants 112 are not shown in FIG. 3 for illustrative clarity and convenience. However the medium 104 and the colorant supply 106 are both present during the operation of FIG. 3. For instance, the functionality ascribed to the processor 102 can be realized by the processor 102 executing the code 116 from the medium 104, and the print engine 110 prints onto physical media using the colorants 112 of the colorant supply 106.

The processor receives a color print job 302. The print job 302 is a color print job in that to print the print job 302, the print engine 110 uses more than one color of colorant 112 of the colorant supply 106 of FIG. 1. That is, the print engine 110 uses multiple colorants 112 to print the print job 302. By comparison, the print jobs 202 of FIG. 2 are monochromatic print jobs in that to print each print job 202, the print engine 110 uses just one color of colorant 112 of the colorant supply 106. That is, the print engine 110 uses just one colorant 112 to print each print job 202, which may be the same or different colorant 112 as that used for any other print job 202.

The processor 110 divides the color print job 302 in FIG. 3 into color components 304C, 304M, 304Y, and 304K, which are collectively referred to as the color components 304. More generally, the processor 110 divides the color print job 302 into color components 304 corresponding to the colors of the color space or model that the printing device 100 uses to print in color. Stated another way, the processor 110 divides the color print job 302 into color components 304 corresponding to the colors of the colorants 112. As part of this division process, the processor 110 may first convert the received print job 302 from one color space or model to the color space or model that the printing device 100 uses. For instance, the processor 110 may convert the print job 302 from a red, green, and blue (RGB) color space to the CMYK color space of the printing device 100, before performing color separation on the print job 302 into the constituent cyan, magenta, yellow, and black color components 304 of the CMYK color space.

The processor 110 transmits the color components 304 to the respective color channels 114 for processing. The cyan color channel 114C thus processes the cyan color component 304C, the magenta color channel 114M processes the magenta color component 304M, the yellow color channel 114Y processes the yellow color component 304Y, and the black color channel 114K processes the black color component 304K. The color channels 114 can process their respectively received color components 304 of the print job 302 in parallel. For instance, if the print job 302 is compressed, the channels 114 may decompress the resulting compressed color components 304 into which the processor 102 separates or divides the print job 302.

The color channels 114C, 114M, 114Y, and 114K output processed versions of the color components 304C, 304M, 304Y, and 304K of the print job 302, respectively, which are identified as the processed color components 304C', 304M', 304Y', and 304K' in FIG. 3, and which are collectively referred to as the processed color components 304'. The processed color components 304' are output to the print engine 110. Stated another way, the processor 102 can, upon completion of processing of the color components 304 by the color channels 114, transmit the processed color components 304' to the print engine 110. The print engine 110 then uses the colorant supply 106 of FIG. 1 to effectively output the print job 302 onto a physical medium.

The print engine 110 may have to have all the processed color components 304' of a page of the print job 302 before it can print an image corresponding to this page onto a physical medium. In this case, the processor 102 may not transmit the processed color components 304' of any page of any color print job to the print engine 110 until all the components 304' have been completed. However, the print engine 110 may use the colorants 112 corresponding to the color components 304' in a particular order to print an image corresponding to a page of a color print job 302. In this case, the processor 102 may transmit the processed color components 304' of any page of any color print job in the particular order in question to the print engine 110, such that the processor 102 may not have to wait for all the processed components 304' to be completed before transmitting the components 304' to the print engine 112.

FIG. 4 shows an example method 400 for printing a monochromatic print job within the printing device 100. The method 400 may be implemented as the program code 116 stored on the computer-readable medium 104 and executed by the processor 102. The method 400 is performed for each monochromatic print job that the printing device 100 receives. In general, the method 400 receives monochromatic print jobs, transmits the received print jobs to unused color channels 114 for processing, and then transmits the processed print jobs to the print engine 110 for printing.

More specifically then, the method 400 includes receiving a monochromatic print job (402), such as from a host computing device. As noted above, a print job may be considered as having one or more pages, or may be considered as one page of an "overall" print job. If there are no unused data-processing color channels 114 of the circuit 108 available for processing the received print job (404), then the method 400 waits until a color channel 114 becomes unused (406). For example, if four monochromatic print jobs have already been received and are currently undergoing processing by respective color channels 114, then a fifth received monochromatic print job has to wait for one of the color channels 114 to finish processing its current print job before the color channel 114 can process the new, fifth print job.

If there is an unused data-processing color channel 114 (404), or after waiting for a color channel 114 that is currently being used to finish its processing and thus again become unused (406), the method 400 selects an unused color channel 114 for the monochromatic print job received in part 402 (408). If there is more than one color channel 114 that is currently unused, the method 400 may select a particular color channel 114 for the received print job in any manner. For instance, the method 400 may randomly select a color channel 114 from the currently unused channels 114, or may select the color channel 114 successively, in order, from the channels 114C, 114M, 114Y, and 114K that are currently unused. As noted above, an unused color channel 114 is selected for a received monochromatic print job regardless of whether the colorant 112 to which color channel 14 corresponds is the (one) specified color of the print job.

The method 400 thus transmits the received monochromatic print job to the selected data-processing color channel 114 (410). Once the selected color channel 114 has finished processing the print job, the method 400 transmits the processed print job to the print engine 110 for printing onto a physical medium (412). The selected color channel 114 thus again becomes unused. The processed print job may be transmitted to the print engine 110 in a particular order relative to other print jobs, as noted above. For example, if each print job corresponds to a page of an "overall" print job, then the method 400 may transmit the processed print jobs to the print engine 110 in the order of their appearance within the "overall" print job (i.e., in page order), regardless of the order in which their processing is completed by the color channels 114.

The method 400 is repeated each time a monochromatic print job is received, such as for a second print job, a third print job, and so on. As such, in one implementation, when the data-processing color channels 114 are all currently unused, repeated performance of the method 400 can result in successive selection of the color channels 114 for successively received print jobs, until none of the channels 114 remain unused. The receipt of another (e.g., fifth) monochromatic print job at that time, when the color channels 114 are all currently in use, results in part 406 being performed, such that the method 400 waits until one of the channels 114 again becomes unused. For instance, if each print job corresponds to a different print of an overall print job, the method 400 can successively transmit the print jobs to unused color channels 114 as they become available, until no more unprocessed print jobs (i.e., unprocessed pages) remain.

FIG. 5 shows an example method 500 for printing a color print job within the printing device 100. A color print job may be considered any print job that uses two or more colorants 112 to print, whereas a monochromatic print job may be considered any print job that uses just one colorant 112 to print. The method 500 may be implemented as the program code 116 stored on the computer-readable medium 104 and executed by the processor 102. The method 500 is performed for each color print job that the printing device 100 receives. The printing device 100 thus performs the methods 400 and 500 depending on the types of print jobs received.

The method 500 includes receiving a color print job (502), such as from a host computing device. The method 500 divides the print job into color components corresponding to the different colors of the colorants 112 (504). The method 500 transmits each color component of the print job to the corresponding data-processing color channel 114 (506). For example, the cyan color component can be sent to the cyan color channel 114C, the magenta color component can be sent to the magenta color channel 114M, the yellow color component can be sent to the color channel 114Y, and the black color component can be sent to the black color channel 114K.

If one or more of the color channels 114 are currently being used for processing of another color print job or for processing of a monochromatic print job, the method 500 can proceed in one of two ways. First, the method 500 may wait until all the color channels 114 remain unused before sending the color components of the received color print job to the channels 114. Second, the method 500 may send the color components of the received color print job to the color channels 114 as the color channels 114 are or become unused.

Once the color channels 114 have finished processing their respective color components of the print job, the method 500 transmits the processed print job to the print engine 110 for printing onto a physical medium (508). That is, the method 500 transmits the processed color components of the received print job to the print engine 110 for printing. The print engine 110 uses the colorants 112 corresponding to the color components to print the print job in color onto the physical medium.

The techniques that have been described leverage the data-processing color channels 114 of a circuit 108 of a printing device 100 for faster processing of monochromatic print jobs. Particularly, rather than just using the color channel 114 corresponding to the color of the monochromatic print jobs, all the color channels 114 may be employed so that monochromatic print jobs can be processed in parallel. A color channel 114 thus may process a monochromatic print job corresponding to a color other than that to which the channel 114 itself corresponds.

We claim:

1. A non-transitory computer-readable data storage medium storing instructions executable by a processor of a color printing device to:
receive a monochromatic print job having one specified color;
select a single unused data-processing color channel of a plurality of data-processing color channels of a circuit of the color printing device, the color channels corresponding to a plurality of different color colorants of the color printing device;
transmit the monochromatic print job to just the selected color channel for processing; and
upon completion of processing of the monochromatic print job by the selected color channel, transmit the processed monochromatic print job to a print engine of the color printing device to output the print job onto a physical medium,
wherein the processor is to select the single unused data-processing color channel regardless of whether the different color colorant to which the selected color channel corresponds is the one specified color of the monochromatic print job.

2. The non-transitory computer-readable medium of claim 1, wherein the monochromatic print job is a page of an overall monochromatic print job having a plurality of pages,
wherein the processor is to successively select single unused data-processing color channels of the data-processing color channels and transmit successive pages of the overall monochromatic print job to just the successively selected color channels, respectively, for processing until none of the data-processing color channels remain unused.

3. The non-transitory computer-readable medium of claim 2, wherein upon completion of processing of any page of the overall monochromatic print job by a particular selectively selected color channel, the particular selectively selected color channel is again unused and available for selection for processing a new page of the overall monochromatic print job.

4. The non-transitory computer-readable medium of claim 2, wherein the processed pages of the overall monochromatic print job are transmitted to the print engine in an order of appearance within the overall monochromatic print job, regardless of an order of completion of processing by the selected color channels.

5. The non-transitory computer-readable medium of claim 1, wherein the monochromatic print job is a first monochromatic print job, the selected color channel is a selected first color channel, and the instructions are executable by the processor to further:
receive a second monochromatic print job;
select a second single unused data-processing color channel of the data-processing color channels;
transmit the second monochromatic print job to just the selected second color channel for processing in parallel with processing of the first monochromatic print job by the selected first color channel; and
upon completion of processing of the second monochromatic print job by the selected second color channel, transmit the processed second monochromatic print job to the print engine to output the second print job onto a second physical medium.

6. The non-transitory computer-readable medium of claim 1, wherein the instructions are executable by the processor to further:
receiving a color print job;
divide the color print job into color components corresponding to the different color colorants;
transmit each color component to the data-processing color channel corresponding to the different color colorant of the color component, for processing in parallel; and
upon completion of processing of the color components by the color channels, transmit the processed color print job to the print engine to output the print job onto a second physical medium.

7. The non-transitory computer-readable medium of claim 1, wherein the circuit is a time-delineated multipurpose (TDMP) application-specific integrated circuit (ASIC), and the processing comprises decompression of the monochromatic print job.

8. A color printing device comprising:
a print engine to print onto physical media using a plurality of different color colorants;
a circuit having a plurality of data-processing color channels corresponding to the different color colorants; and
a processor to receive a plurality of monochromatic print jobs, to transmit the received monochromatic print jobs just to respective single unused color channels of the color channels for processing in parallel, and to transmit the processed monochromatic print jobs to the print engine for printing.

9. The color printing device of claim 8, wherein each monochromatic print job has one specified color,
and wherein the processor is to transmit the received monochromatic print jobs just to the respective single unused color channels for processing in parallel, regardless of whether the different color colorant to which each unused color channel corresponds is the one specified color of the monochromatic print job transmitted to the unused color channel.

10. The color printing device of claim 8, wherein the processor is further to receive a color print job, to divide the color print job into color components corresponding to the different color colorants, to transmit each color component to the color channel corresponding to the different color colorant of the color component for processing in parallel, and to transmit the processed color components to the print engine for printing.

11. The color printing device of claim 8, further comprising:
a non-transitory computer-readable data storage medium storing program code that the processor executes,
wherein the circuit is a time-delineated multipurpose (TDMP) application-specific integrated circuit (ASIC), and the processing comprises decompression of the monochromatic print job,
and wherein the print engine is a laser printing engine.

12. A method comprising:
receiving, by a processor of a color printing device, a monochromatic print job having a plurality of pages;
transmitting, by the processor, successive pages of the print job just to respective single unused data-processing color channels of a plurality of data-processing color channels of a circuit of the color printing device for processing in parallel, until no color channel remains unused, the color channels corresponding to a plurality of different color colorants of the color printing device;

upon completion of processing of a given page of the print job by the color channel to which the given page was transmitted, transmitting, by the processor, another page of the print job to the color channel to which the given page was transmitted if the print job has any unprocessed pages remaining; and transmitting, by the processor, the processed pages of the print job in order of appearance within the print job to a print engine of the color printing device for printing.

13. The method of claim 12, further comprising:

receiving, by the processor, a color print job;

dividing, by the processor, the color print job into color components corresponding to the different color colorants;

transmitting, by the processor, each color component to the color channel corresponding to the different color colorant of the color component for processing in parallel; and transmitting, by the processor, the processed color components to the print engine for printing.

14. The method of claim 12, wherein the circuit is a time-delineated multipurpose (TDMP) application-specific integrated circuit (ASIC), and the processing comprises decompression of the monochromatic print job.

* * * * *